(12) United States Patent
    Karras

(10) Patent No.: US 9,396,512 B2
(45) Date of Patent: Jul. 19, 2016

(54) FULLY PARALLEL CONSTRUCTION OF K-D TREES, OCTREES, AND QUADTREES IN A GRAPHICS PROCESSING UNIT

(71) Applicant: NVIDIA Corporation, Santa Clara, CA (US)

(72) Inventor: Tero Karras, Helsinki (FI)

(73) Assignee: NVIDIA CORPORATION, Santa Clara, CA (US)

( * ) Notice: Subject to any disclaimer, the term of this patent is extended or adjusted under 35 U.S.C. 154(b) by 284 days.

(21) Appl. No.: 13/791,738

(22) Filed: Mar. 8, 2013

(65) Prior Publication Data

US 2013/0235050 A1    Sep. 12, 2013

Related U.S. Application Data

(63) Continuation-in-part of application No. 13/727,492, filed on Dec. 26, 2012, and a continuation-in-part of application No. 13/732,103, filed on Dec. 31, 2012.

(60) Provisional application No. 61/609,156, filed on Mar. 9, 2012.

(51) Int. Cl.
    *G06T 15/00*    (2011.01)
    *G06T 1/20*     (2006.01)
    *G06T 17/00*    (2006.01)

(52) U.S. Cl.
    CPC .............. *G06T 1/20* (2013.01); *G06T 17/005* (2013.01); *G06T 2210/52* (2013.01)

(58) Field of Classification Search
    None
    See application file for complete search history.

(56) References Cited

U.S. PATENT DOCUMENTS

| | | | |
|---|---|---|---|
| 5,826,262 A | 10/1998 | Bui et al. | |
| 7,299,317 B1 | 11/2007 | Panigrahy et al. | |
| 7,475,071 B1 | 1/2009 | Liu et al. | |
| 7,512,617 B2 | 3/2009 | Lock et al. | |
| 2004/0051728 A1* | 3/2004 | Vienneau et al. | 345/723 |
| 2004/0249781 A1 | 12/2004 | Anderson | |
| 2006/0139349 A1* | 6/2006 | Reshetov et al. | 345/426 |

(Continued)

OTHER PUBLICATIONS

Lauterbach et al., Fast BVH Construction on GPUs, 2009, Computer Graphics Forum, vol. 28, No. 2, pp. 375-384.*

(Continued)

*Primary Examiner* — Anh-Tuan V Nguyen

(57) ABSTRACT

A non-transitory computer-readable storage medium having computer-executable instructions for causing a computer system to perform a method for constructing k-d trees, octrees, and quadtrees from radix trees is disclosed. The method includes assigning a Morton code for each of a plurality of primitives corresponding to leaf nodes of a binary radix tree, and sorting the plurality of Morton codes. The method includes building a radix tree requiring at most a linear amount of temporary storage with respect to the leaf nodes, wherein an internal node is built in parallel with one or more of its ancestor nodes. The method includes, partitioning the plurality of Morton codes for each node of the radix tree into categories based on a corresponding highest differing bit to build a k-d tree. A number of octree or quadtree nodes is determined for each node of the k-d tree. A total number of nodes in the octree or quadtree is determined, allocated and output.

16 Claims, 8 Drawing Sheets

(56) References Cited

U.S. PATENT DOCUMENTS

| | | | |
|---|---|---|---|
| 2008/0074417 A1* | 3/2008 | Mejdrich et al. | 345/420 |
| 2009/0106530 A1 | 4/2009 | Lauterbach et al. | |
| 2010/0085352 A1* | 4/2010 | Zhou et al. | 345/419 |
| 2011/0219069 A1 | 9/2011 | Varvello et al. | |
| 2011/0316854 A1* | 12/2011 | Vandrovec | 345/420 |
| 2012/0023082 A1 | 1/2012 | Kotha et al. | |
| 2012/0173500 A1 | 7/2012 | Chakrabarti et al. | |
| 2012/0299914 A1* | 11/2012 | Kilpatrick et al. | 345/420 |
| 2012/0313944 A1* | 12/2012 | Kontkanen et al. | 345/426 |
| 2012/0320073 A1* | 12/2012 | Mason | 345/581 |
| 2013/0034309 A1* | 2/2013 | Nystad et al. | 382/240 |

OTHER PUBLICATIONS

S. A. Cameron and C. K. Yap, Renement Methods for Geometric Bounds in Constructive Solid Geometry, ACM Transactions on Graphics, 11 (1):12{39, Jan. 1992.

Cohen, Jonathan D., et al. "I-Collide: An Interactive and Exact Collision Detection System for Large-Scale Environments." Proceedings of the 1995 symposium on Interactive 3D graphics. ACM, 1995.

Foley, Tim, and Jeramy Sugerman, "KD-Tree Acceleration Structures for a GPU Ray Tracer." Proceedings of the ACM SIGGRAPH/Eurographics conference on Graphics hardware. ACM, 2005.

Gebali, Fayez, "Algorithms for Parallel Computing", John Wiley & Sons, Inc., Apr. 19, 2011, p. 2,137-139.

* cited by examiner

500

FOR A GIVEN NODE INDEX CORRESPONDING TO AN INTERNAL NODE, DETERMINING A DIRECTION OF A CORRESPONDING RANGE OF PRIMITIVE INDEXES OF THE PLURALITY OF PRIMITIVES BASED ON THE NODE INDEX, WHEREIN THE GIVEN NODE INDEX COMPRISES A BEGINNING PRIMITIVE INDEX OR AN ENDING PRIMITIVE INDEX IN SAID CORRESPONDING RANGE
510

↓

DETERMINING A LENGTH OF THE CORRESPONDING RANGE
520

↓

DETERMINING A HIGHEST DIFFERING BIT BETWEEN PRIMITIVE INDEXES IN SAID CORRESPONDING RANGE
530

↓

ASSIGNING CHILD NODE INDEXES FOR THE GIVEN NODE INDEX CORRESPONDING TO THE PRIMITIVE INDEXES ASSOCIATED WITH THE HIGHEST DIFFERING BIT
540

```
1:  for each internal node with index i ∈ [0, n − 2] in parallel
2:      // Determine direction of the range (+1 or -1)
3:      d ← sign(δ(i, i + 1) − δ(i, i − 1))
4:      // Compute upper bound for the length of the range
5:      δ_min ← δ(i, i − d)
6:      l_max ← 2
7:      while δ(i, i + l_max · d) > δ_min do
8:          l_max ← l_max · 2
9:      // Find the other end using binary search
10:     l ← 0
11:     for t ← {l_max / 2, l_max / 4, ..., 1} do
12:         if δ(i, i + (l + t) · d) > δ_min then
13:             l ← l + t
14:     j ← i + l · d
15:     // Find the split position using binary search
16:     δ_node ← δ(i, j)
17:     s ← 0
18:     for t ← {⌈l/2⌉, ⌈l/4⌉, ..., 1} do
19:         if δ(i, i + (s + t) · d) > δ_node then
20:             s ← s + t
21:     γ ← i + s · d + min(d, 0)
22:     // Output child pointers
23:     if min(i, j) = γ then left ← L_γ else left ← I_γ
24:     if max(i, j) = γ + 1 then right ← L_{γ+1} else right ← I_{γ+1}
25:     I_i ← (left, right)
26: end for
```

FIG. 6

FULLY PARALLEL CONSTRUCTION OF K-D TREES, OCTREES, AND QUADTREES IN A GRAPHICS PROCESSING UNIT

CROSS REFERENCE TO RELATED APPLICATIONS

This application is a conversion of and claims priority to and the benefit of Provisional Patent Application No. 61/609,156, entitled "FULLY PARALLEL IN-PLACE CONSTRUCTION OF 3D ACCELERATION STRUCTURES ON A GPU," having a filing Date of Mar. 9, 2012, which is herein incorporated by reference in its entirety.

This application is a Continuation-in-Part (CIP) to patent application Ser. No. 13/727,492, entitled "FULLY PARALLEL IN-PLACE CONSTRUCTION OF 3D ACCELERATION STRUCTURES IN A GRAPHICS PROCESSING UNIT,", having a filing date of Dec. 26, 2012, which is herein incorporated by reference in its entirety.

This application is a Continuation-in-Part (CIP) to patent application Ser. No. 13/732,103, entitled "FULLY PARALLEL IN-PLACE CONSTRUCTION OF 3D ACCELERATION STRUCTURES AND BOUNDING VOLUME HIERARCHIES IN A GRAPHICS PROCESSING UNIT,", having a filing date of Dec. 31, 2012, which is herein incorporated by reference in its entirety.

BACKGROUND

In recent years, general-purpose computing has given rise to a number of methods for constructing bounding volume hierarchies (BVHs), octrees, and k-d trees for millions of primitives in real-time. Some methods aim to maximize the quality of the resulting tree using the surface area heuristic, while others choose to trade tree quality for increased construction speed.

The right quality vs. speed tradeoff depends heavily on the application. Tree quality is usually preferable in ray tracing where the same acceleration structure is often reused for millions of rays. Broad-phase collision detection and particle interaction in real-time physics represent the other extreme, where construction speed is of primary importance—the acceleration structure has to be reconstructed on every time step, and the number of queries is usually fairly small. Furthermore, certain applications, such as voxel-based global illumination and surface reconstruction, specifically rely on regular octrees and k-d trees, where tree quality is fixed.

The main shortcoming with existing methods that aim to maximize construction speed is that they generate the node hierarchy in a sequential fashion, usually one level at a time, since each round of processing has to complete before the next one can begin. This limits the amount of parallelism that they can achieve at the top levels of the tree, and can lead to serious underutilization of the parallel cores. The sequential processing is already a bottleneck with small workloads on current GPUs, which require tens of thousands of independent parallel threads to fully utilize their computing power. The problem can be expected to become even more significant in the future as the number of parallel cores keeps increasing. Another implication of sequential processing is that the existing methods output the hierarchy in a breadth-first order, even though a depth-first order would usually be preferable considering data locality and cache hit rates.

SUMMARY

A computer implemented method and system for maximizing parallelism in the construction of hierarchical trees, such as, bounding volume hierarchies (BVHs), k-d trees, octrees, and quadtrees. Embodiments of the present invention provides for a fast method for constructing BVHs, k-d trees, octrees, and quadtrees so that the overall performance scales linearly with the number of available cores and the resulting data structure is always in a strict depth-first order. The novel method includes constructing binary radix trees in a fully data-parallel fashion. The binary radix tree is then used as a building block for efficiently constructing other types of trees.

In one embodiment, a non-transitory computer-readable storage medium having computer-executable instructions for causing a computer system to perform a method is disclosed. The method includes taking a plurality of primitives as input wherein the plurality of primitives correspond to leaf nodes of a hierarchical tree. The method includes sorting the plurality of primitives. The method includes building the hierarchical tree in a manner requiring at most a linear amount of temporary storage with respect to the total number of leaf nodes. The method also includes building an internal node of the hierarchical tree in parallel with one or more of its ancestor nodes. That is, one or more internal nodes of the hierarchical tree are built in parallel with one or more of their respective ancestor nodes.

In another embodiment, a computer system is disclosed comprising a processor, and a memory coupled to the processor and having stored therein instructions that, if executed by the computer system cause the computer system to execute a method. The method includes taking a plurality of primitives as input, wherein the plurality of primitives correspond to leaf nodes of a hierarchical tree. The method includes sorting the plurality of primitives. The method includes building the hierarchical tree in a manner requiring at most a linear amount of temporary storage with respect to the total number of leaf nodes. The method also includes building an internal node of the hierarchical tree in parallel with one or more of its ancestor nodes. That is, one or more internal nodes of the hierarchical tree are built in parallel with one or more of their respective ancestor nodes.

In still another embodiment, a system is disclosed comprising means for assigning a Morton code to a plurality of primitives, wherein the plurality of primitives correspond to leaf nodes of a hierarchical tree. The system includes means for sorting the plurality of primitives. The system includes means for building the hierarchical tree in a manner requiring at most a linear amount of temporary storage with respect to the total number of leaf nodes. The system also includes means for building an internal node of the hierarchical tree in parallel with one or more of its ancestor nodes. That is, one or more internal nodes of the hierarchical tree are built in parallel with one or more of their respective ancestor nodes.

In one embodiment, a non-transitory computer-readable storage medium having computer-executable instructions for causing a computer system to perform a method for constructing k-d trees is disclosed. The method includes assigning a Morton code for each of a plurality of primitives, wherein the plurality of primitives correspond to leaf nodes of a binary radix tree. The method includes sorting the plurality of Morton codes. The method also includes building the binary radix tree requiring at most a linear amount of temporary storage with respect to the total number of leaf nodes. When building the binary radix tree, an internal node is built in parallel with one or more of its ancestor nodes. The method also includes, for each internal node of the binary radix tree, partitioning the plurality of Morton codes into categories based on a corresponding highest differing bit to build a k-d tree over the plurality of primitives.

In one embodiment, a non-transitory computer-readable storage medium having computer-executable instructions for causing a computer system to perform a method for constructing octrees is disclosed. The method includes assigning a Morton code for each of a plurality of primitives, and sorting the plurality of Morton codes. The plurality of primitives correspond to leaf nodes of a binary radix tree. The method includes building the binary radix tree requiring at most a linear amount of temporary storage with respect to the total number of leaf nodes. When building the binary radix tree, the method includes building an internal node of the binary radix tree in parallel with one or more of its ancestor nodes. The method includes, for each internal node of the binary radix tree, partitioning the plurality of Morton codes into categories based on a corresponding highest differing bit to build a k-d tree over the plurality of primitives. The method includes determining a number of octree nodes for each node of said k-d tree. The method also includes determining a total number of octree nodes, allocating the octree nodes, and outputting the total number of octree nodes.

In another embodiment, a non-transitory computer-readable storage medium having computer-executable instructions for causing a computer system to perform a similar method for constructing quadtrees instead of octrees is disclosed. The method includes assigning a Morton code for each of a plurality of primitives, and sorting the plurality of Morton codes. The Morton code for a given point is defined by the bit string X0Y0X1Y1, since the z-coordinate is not meaningful in the case of a 2D quadtree. A prefix of length $\delta$ corresponds to a plane perpendicular to the dth main axis, where d=$\delta$ mod 2. The position of the plane is given by $0.B_d B_{d+2} \ldots B_{\delta-2} 1$. The number of quadtree nodes corresponding to a given edge in intermediary k-d tree is determined by counting the number of bit pair boundary crossings between the parent node and the child node.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 5 is a flow diagram illustrating a method for constructing binary radix trees in parallel, in accordance with one embodiment of the present disclosure.

FIG. 6 is an illustration of pseudocode for constructing a binary radix tree, in accordance with one embodiment of the present disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "sorting," "determining," "building," "assigning," or the like, refer to actions and processes (e.g., flowcharts 200 and 500 of FIGS. 2 and 5, respectively) of a computer system or similar electronic computing device or processor (e.g., system 100 of FIG. 1). The computer system or similar electronic computing device manipulates and transforms data represented as physical (electronic) quantities within the computer system memories, registers or other such information storage, transmission or display devices.

Figure 2:
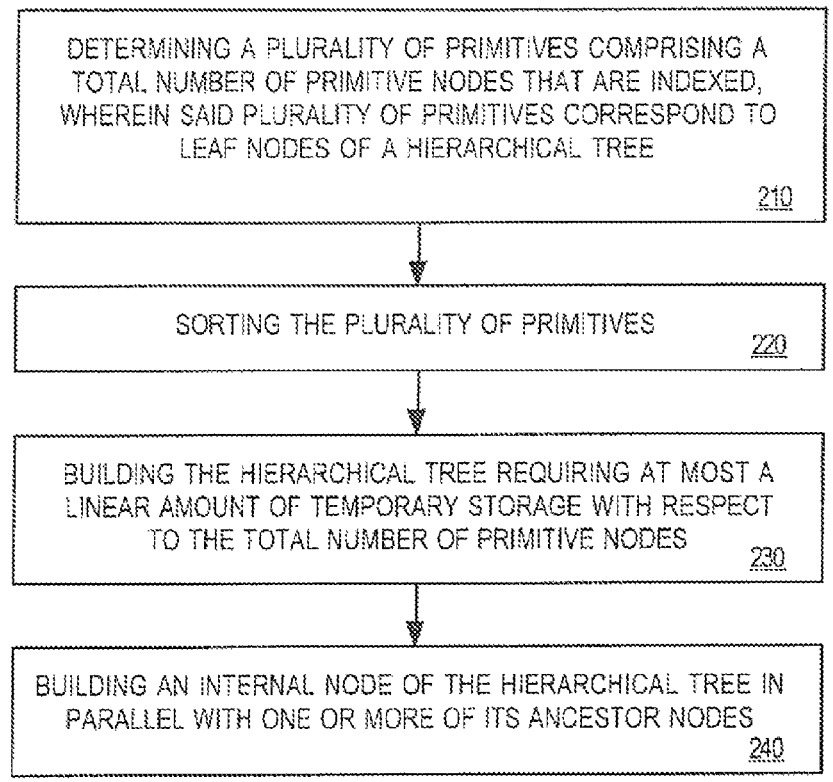
FIG. 2 is a flow diagram illustrating a computer implemented method for constructing hierarchical trees in parallel, in accordance with one embodiment of the present disclosure.

FIG. 2 is a flowchart of examples of computer-implemented methods for processing data according to embodiments of the present invention. Although specific steps are disclosed in the flowcharts, such steps are exemplary. That is, embodiments of the present invention are well-suited to performing various other steps or variations of the steps recited in the flowcharts.

Embodiments of the present invention described herein are discussed within the context of hardware-based components configured for monitoring and executing instructions. That is, embodiments of the present invention are implemented within hardware devices of a micro-architecture, and are configured for monitoring for critical stall conditions and performing appropriate clock-gating for purposes of power management.

Other embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Figure 1:
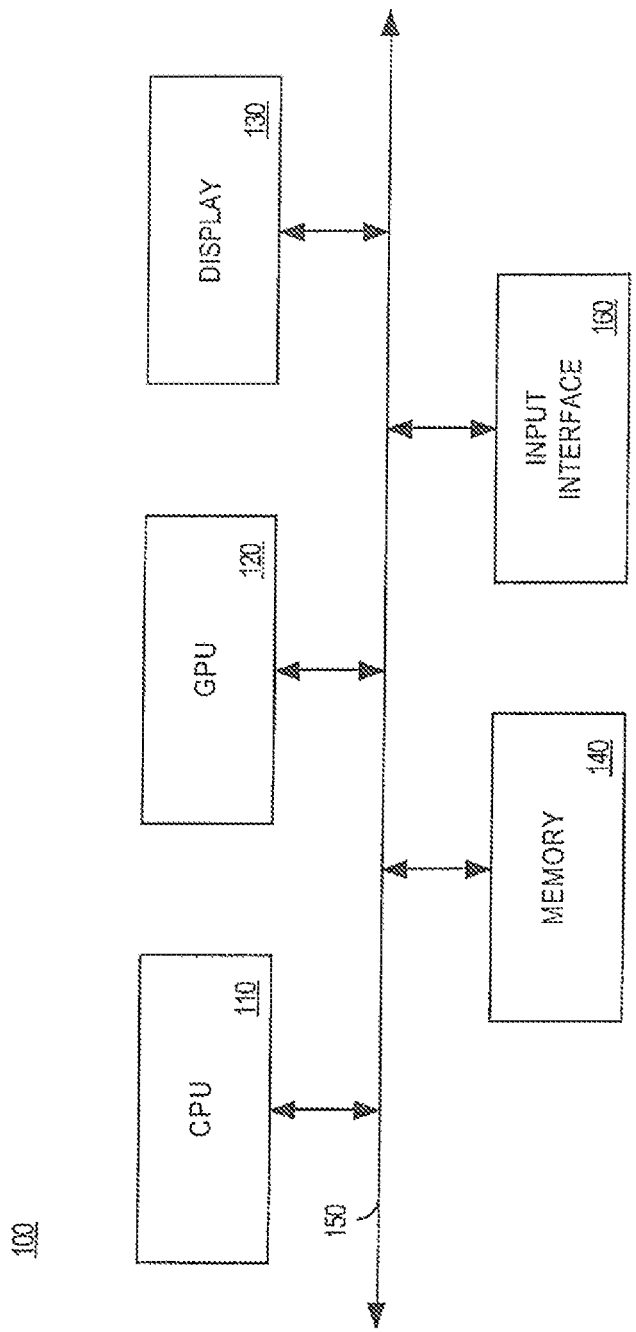
FIG. 1 depicts a block diagram of an exemplary computer system suitable for implementing the present methods, in accordance with one embodiment of the present disclosure.

FIG. 1 is a block diagram of an example of a computing system 100 capable of implementing embodiments of the present disclosure. Computing system 10 broadly represents any single or multi-processor computing device or system capable of executing computer-readable instructions. Examples of computing system 100 include, without limitation, workstations, laptops, client-side terminals, servers, distributed computing systems, handheld devices, or any other computing system or device. In its most basic configuration, computing system 100 may include at least one processor 110 and a system memory 140.

Both the central processing unit (CPU) 110 and the graphics processing unit (GPU) 120 are coupled to memory 140. System memory 140 generally represents any type or form of volatile or non-volatile storage device or medium capable of storing data and/or other computer-readable instructions. Examples of system memory 140 include, without limitation, RAM, ROM, flash memory, or any other suitable memory device. In the example of FIG. 1, memory 140 is a shared memory, whereby the memory stores instructions and data for both the CPU 110 and the GPU 120. Alternatively, there may be separate memories dedicated to the CPU 110 and the GPU 120, respectively. The memory can include a frame buffer for storing pixel data drives a display screen 130.

The system 100 includes a user interface 160 that, in one implementation, includes an on-screen cursor control device. The user interface may include a keyboard, a mouse, and/or a touch screen device (a touchpad).

CPU 110 and/or GPU 120 generally represent any type or form of processing unit capable of processing data or interpreting and executing instructions. In certain embodiments, processors 110 and/or 120 may receive instructions from a software application or hardware module. These instructions may cause processors 110 and/or 120 to perform the functions of one or more of the example embodiments described and/or illustrated herein. For example, processors 110 and/or 120 may perform and/or be a means for performing, either alone or in combination with other elements, one or more of the monitoring, determining, gating, and detecting, or the like described herein. Processors 110 and/or 120 may also perform and/or be a means for performing any other steps, methods, or processes described and/or illustrated herein.

In some embodiments, the computer-readable medium containing a computer program may be loaded into computing system 100. All or a portion of the computer program stored on the computer-readable medium may then be stored in system memory 140 and/or various portions of storage devices. When executed by processors 110 and/or 120, a computer program loaded into computing system 100 may cause processor 110 and/or 120 to perform and/or be a means for performing the functions of the example embodiments described and/or illustrated herein. Additionally or alternatively, the example embodiments described and/or illustrated herein may be implemented in firmware and/or hardware.

Parallel Construction of 3D Acceleration Structures

FIG. 2 is a flow diagram 200 illustrating a computer implemented method for constructing hierarchical trees in parallel, in accordance with one embodiment of the present disclosure. In another embodiment, flow diagram 200 is implemented within a computer system including a processor and memory coupled to the processor and having stored therein instructions that, if executed by the computer system causes the system to execute a method for constructing hierarchical trees in parallel. In still another embodiment, instructions for performing a method are stored on a non-transitory computer-readable storage medium having computer-executable instructions for causing a computer system to perform a method for constructing hierarchical trees in parallel. The method outlined in flow diagram 200 is implementable by one or more components of the computer system 100 of FIG. 1.

In practice, hierarchical trees are used for instance in graphics to accelerate path tracking, real-time ray tracing, collision detection, photon mapping, voxel-based scene representations, etc. In embodiments, trees are constructed quickly in a parallel fashion. That is, in embodiments of the present invention, it is possible for all levels of the hierarchical tree to be processed in parallel from the start. This avoids under-utilization, and makes the performance scale linearly with the size of the GPU.

For clarity, the method of FIG. 2 is described within the context of building bounding volume hierarchies or BVHs, but is well suited to building point-based k-d trees, octrees, and quadtrees.

At 210, the method includes taking a plurality of primitives as input. The plurality is associated and comprises a total number of leaf nodes that are indexed.

In one embodiment, each of the plurality of primitives is assigned a Morton code. Within the context of BVHs, for example, a Morton code is generated for each primitive by finding the centroid point of its bounding box, and looking at its bit representation relative to the scene bounding box. The idea is to expand the bits of each coordinate, and then interleave them to form a single bit string.

To continue the example using BVHs, the Morton code for a given point contained within a three-dimensional (3D) unit cube is defined by the bit string X0Y0Z0X1Y1Z1, where the x coordinate of the point is represented as 0:X0X1X2, etc., and similarly for y and z coordinates. The Morton code of an arbitrary 3D primitive can be defined in terms of the centroid of its axis-aligned bounding box (AABB). In practice, the Morton codes can be limited to 30 or 63 bits in order to store them as 32-bit or 64-bit integers, respectively, in embodiments.

At 220, the method includes sorting the plurality of primitives according to their Morton codes. For instance, in the case of BVHs, this orders them along a space-filling curve, so that primitives close to each other in 3D are likely to end up nearby in the sorted sequence.

At 230, the method includes building the hierarchical tree requiring at most a linear amount of temporary storage with respect to the total number of leaf nodes. That is, the hierarchical tree is built in a manner that requires only a linear amount of memory with respect to the number of input primitives in embodiments of the present invention. Additionally, in one embodiment the hierarchical tree is built or constructed in parallel.

At 240, the method includes building an internal node of the hierarchical tree in parallel with one or more of its ancestor nodes. That is, one or more internal nodes of the hierarchical tree are built in parallel with one or more of their respective ancestor nodes. As such, in embodiments of the present invention at least one node is constructed in parallel with at least one of its ancestor nodes.

In embodiments of the present invention, the construction of the hierarchical tree is performed by constructing a binary radix tree, that is defined over the set of Morton codes. For instance, in the case of BVHs, a node hierarchy is generated wherein each subtree corresponds to a linear range of sorted primitives. In the prior art, a radix tree (binary or otherwise) is commonly used for indexing string data. In one embodiment, the input is the set of primitives, or plurality of primitives that define the leaf nodes. In the present embodiment, the input is the sorted Morton codes. Further, the binary radix tree comprises the leaf nodes and one or more internal nodes. Each internal node corresponds to the longest common prefix shared by primitives of corresponding leaf nodes in a respective subtree.

Figure 3:
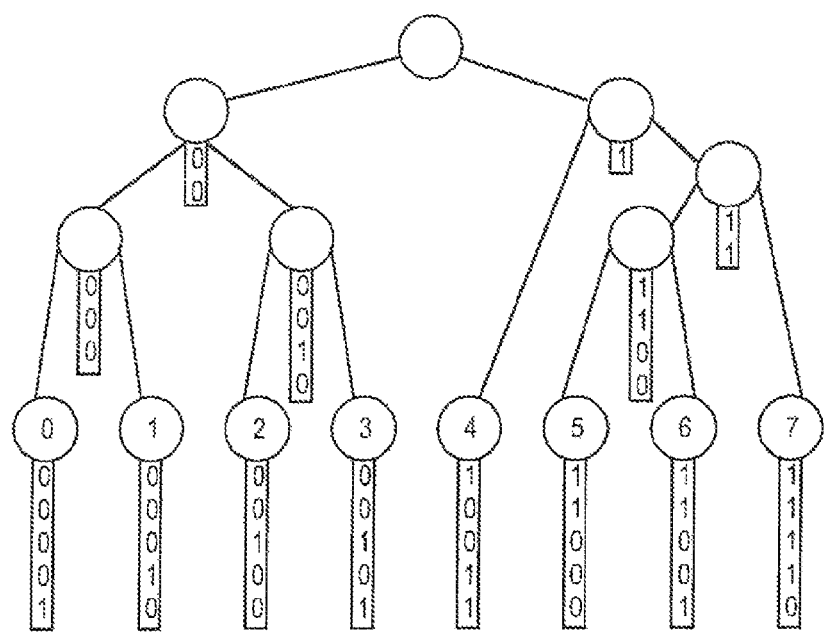
FIG. 3 is a diagram of an ordered binary radix tree used during the construction of the radix tree, in accordance with one embodiment of the present disclosure.

FIG. 3 is a diagram of a binary radix tree 300, in accordance with one embodiment of the present disclosure. In particular, radix tree 300 is an ordered binary radix tree including eight leaf nodes, with index numbering "0-7." The leaf nodes store a set of 5-bit keys in lexicographical order. The leaf nodes or primitives are shown as including 5-bits for illustration purposes, but can be of any length, as previously described. The internal nodes represent their common prefixes. Further, each internal node covers a linear range of keys, which is partitioned into two subranges according to their first differing bit, as will be described below in relation to FIG. 4.

In particular, given a set of n keys $k_0, \ldots, k_{n-1}$ represented as bit strings, a binary radix tree (also called a Patricia tree) is a hierarchical representation of their common prefixes. The keys are represented by the leaf nodes, and each internal node corresponds to the longest common prefix shared by the keys in its respective subtree, as is shown in FIG. 3.

In contrast to a prefix tree, which contains one internal node for every common prefix, a radix tree is compact in the sense that it omits nodes with only one child. Therefore, every binary radix tree with n leaf nodes contains exactly n−1 internal nodes, as is shown in FIG. 3. In one embodiment, a child node is a leaf node. Duplicate keys require special attention, in one embodiment.

More particularly, in one embodiment, ordered trees are only considered, where the children of each node, and consequently the leaf nodes, are in lexicographical order. This is equivalent to requiring that the sequence of keys to be sorted, which enables representing the keys covered by each node as a linear range [i,j]. Using $\delta(i, j)$ to denote the length of the longest common prefix between keys $k_i$ and $k_j$, the ordering implies that $\delta(i', j') \geq \delta(i, j)$ for any i', j'∈[i,j]. The prefix corresponding to a given node is determined by comparing its first and last key, wherein the other keys are guaranteed to share the same prefix.

In effect, each internal node partitions its keys according to their first differing bit, i.e. the one following $\delta(i, j)$. This bit will be zero for a certain number of keys starting from $k_i$ and one for the remaining ones until $k_j$. The index of the last key where the bit is zero is labeled as a "split position", denoted by $\gamma \in [i,j-1]$. Since the bit is zero fork, and one for $k_{\gamma+1}$, the split position must satisfy $\delta(\gamma; \gamma+1) = \gamma(i, j)$. The resulting subranges are given by [i, γ] and [γ+1, j], and are further partitioned by the left and right child node, respectively.

As shown in FIG. 3, the root corresponds to the full range of keys, [0;7]. Since $k_3$ and $k_4$ differ at their first bit, the range is split at γ=3, resulting in subranges [0,3] and [4,7]. The left child further splits [0,3] at γ=1 based on the third bit, and the right child splits [4,7] at γ=4 based on the second bit.

Figure 4:
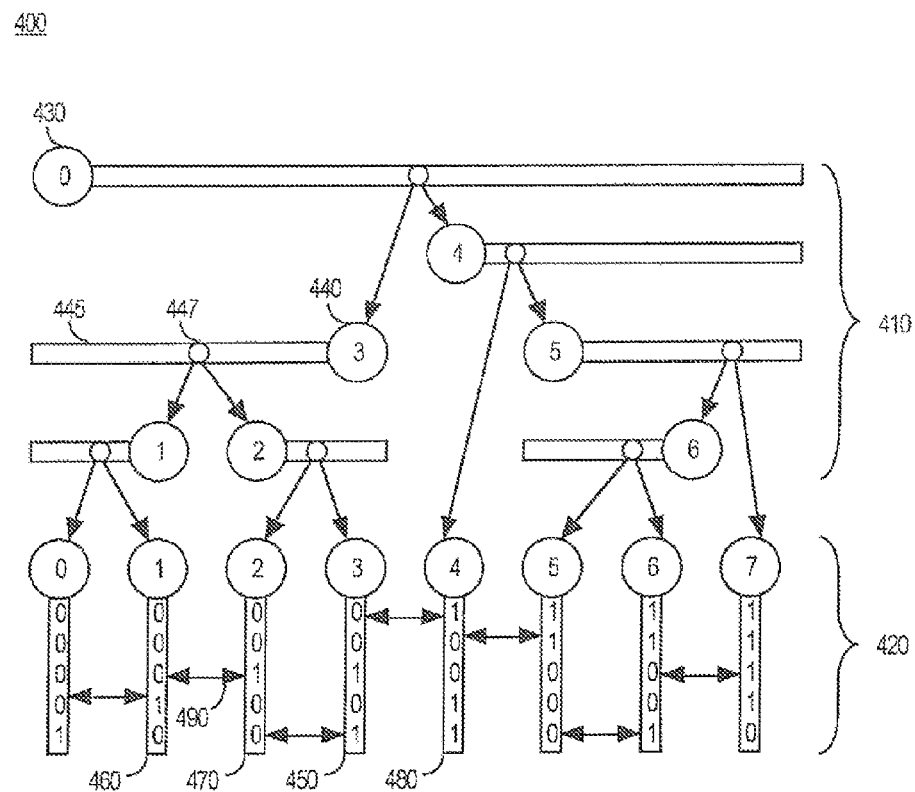
FIG. 4 is a diagram of a node hierarchy layout for a binary radix tree, first introduced in FIG. 3, in accordance with one embodiment of the present disclosure.

FIGS. 4 and 5 are diagrams illustrating the construction of binary radix trees that are subsequently used to construct secondary trees, such as, BVHs, octrees, k-d trees, etc. Specifically, FIG. 4 is a diagram of a node hierarchy layout for a binary radix tree, first introduced in FIG. 3, and FIG. 5 is a flow diagram illustrating a method for constructing binary radix trees in parallel, in accordance with embodiments of the present disclosure.

FIG. 4 is a diagram of an ordered binary radix tree 400, first introduced in FIG. 3, wherein the leaf nodes are numbered "0-7" and are associated with a set of 5-bit keys (e.g., Morton codes) sorted in lexicographical order, in accordance with one embodiment of the present disclosure. For instance, leaf node "1" is associated with a 5-bit Morton code "0-0-0-1-0" and leaf node "2" is associated with a 5-bit Morton code "0-0-0-1-0-0."

As shown in FIG. 4, to enable parallel construction of the binary radix tree 400, a connection is established between internal node indices 410 and the primitive indices (of the leaf nodes) 420 through the layout shown in FIG. 4. That is, indices of the internal nodes are assigned in a way to enable finding their children without depending on earlier results. In particular, as shown in FIG. 4, each internal node has been assigned an index between "0-6", and is aligned vertically with a leaf node of the same index. For instance, internal node index 3 440 is vertically aligned with leaf node or primitive index "3" 450.

Also, the range of keys (e.g., leaf nodes) covered by each internal node is indicated by a horizontal bar, and the split position, corresponding to the first bit that differs between the keys is indicted by a circle. For instance, internal node index "3" 440 is associated with range 445 (shown by the horizontal bar) that includes leaf nodes "0-3". The split position is shown by circle 447, and indicates that the highest differing bit is between leaf node indices "1" 460 and "2" 470.

The leaf nodes and the internal nodes are stored in two separate arrays, L and I, respectively, for clarity and purposes of illustration. The node layout in FIG. 4 is defined so that the root node 430 is located at $I_0$, and the indices of its children, as well as the children of any internal node, are assigned according to its respective split position, as will be described more fully in relation to FIG. 5. For instance, the left child is located at $I_\gamma$ if it covers more than one key, or at $L_\gamma$ if it is a leaf. Similarly, the right child is located at $I_{\gamma+1}$ or $L_{\gamma+1}$, as is shown in FIG. 4.

An important property of the node layout shown in FIG. 4 is that the index of each internal node includes and coincides with the index of either its first primitive or leaf node, or its last primitive or leaf node. Also, the root node "0" 430 is located at the beginning of its range [0; n−1], such that the left child of any internal node is located at the end of its range [i; γ], and the right child is located at the beginning of its range [γ+1; j].

FIG. 5 is a flow diagram 500 illustrating a computer implemented method for constructing binary radix trees in parallel, in accordance with one embodiment of the present disclosure. In another embodiment, flow diagram 500 is implemented within a computer system including a processor and memory coupled to the processor and having stored therein instructions that, if executed by the computer system causes the system to execute a method for constructing hierarchical trees in parallel. In still another embodiment, instructions for performing a method are stored on a non-transitory computer-readable storage medium having computer-executable instructions for causing a computer system to perform a method for constructing hierarchical trees in parallel. The method outlined in flow diagram 500 is implementable by one or more components of the computer system 100 of FIG. 1.

The method outlined in FIG. 5 expands on the process outlined in 230 of FIG. 2 to build the hierarchical tree, in one embodiment. Specifically, the node hierarchy is generated by partitioning the primitives, or leaf nodes. In one embodiment, the partitioning is performed by constructing a radix tree, defined over the set of Morton codes representing the leaf nodes. More particularly, parallel construction of the node hierarchy is performed by establishing a connection between the internal node indices and the primitive indices of the leaf nodes through the tree layout shown in FIGS. 3 and 4. That is, indices for the internal nodes are assigned in a way that enables finding their children nodes without depending on earlier results. In that manner, no synchronization is performed between layers of the node hierarchy. Also, in that manner, one or more internal nodes of the hierarchical tree are built in parallel with one or more of their respective ancestor nodes.

In particular, in order to construct a binary radix tree, the process outlined in FIG. 5 determines the range of keys covered by each internal node, and determines children (two since this is a binary radix tree) of each internal node. Since, the index of each internal node coincides with the index of either its first primitive or leaf node, or its last primitive or leaf node, as described above, one end of the range is determined. The other end of the range is determined by looking at neighboring primitive indices. Thereafter, the children can then be identified by finding the split position, by virtue of the node layout, as illustrated in FIG. 4 for example, and as further described below.

In one embodiment, the process outlined in FIG. 5 is performed using pseudocode 600 illustrated in FIG. 6, wherein pseudocode 600 constructs a binary radix tree. For simplicity, in pseudocode 600, $\delta(i, j) = -1$ when $j \notin [0, n-1]$. More particularly, each internal node $I_i$ is processed in parallel, in one embodiment.

At 510, for a given node index corresponding to an internal node, the method of FIG. 5 includes determining a direction of a corresponding range of primitive indices of the plurality of primitives based on the node index. Within the radix tree, each internal node belongs to a range of primitive indices. More particularly, a relationship exists between an internal node of an assigned index, and a primitive with the same index. Specifically, the primitive with the same index is included in the corresponding range of primitive indices. Further, the given node index comprises a beginning primitive index or an ending primitive index in the corresponding range.

In particular, the direction of the range is determined from neighboring primitive indices. That is, the "direction" of the range is determined by looking at the neighboring keys $k_{i-1}$, $k_i$, $k_{i+1}$. The direction is denoted by d, so that d=+1 indicates a range beginning at i, and d=−1 indicates a range ending at i. Since every internal node covers at least two keys, it is determined as a property of the tree structure of FIG. 5 that $k_i$ and $k_{i+d}$ must belong to $I_{i-d}$. In addition, it is determined as a property of the tree structure of FIG. 5 that $k_{i-d}$ belongs to a sibling node $I_{i-d}$, since siblings are always located next to each other.

More specifically, the direction of a range is determined based on which neighboring primitive has the most index matches. For example, in FIG. 4, the range for the internal node index "3" 440 begins or ends with primitive index or leaf node "3" 450. The direction is determined by comparing the neighboring indexes or leaf nodes, such as, primitive index "2" 470 and primitive index "4" 480, with the primitive having the same index as the internal node (e.g., primitive index "3" 450). As such, primitive index "2" 470 has a Morton code sequence of "0-0-1-0-0", primitive index "3" 450 has a Morton code sequence of "0-0-1-0-1", and primitive index "4" has a Morton code sequence of "1-0-0-1-1." The primitive index with the most matches to primitive index "3" 450 is primitive index "2" 470. As such, the direction of the range 445 goes to the left to include primitive index "2" 470, such that the range 445 includes primitive indices "0-3".

For example, the direction is determined in lines 2-3 of pseudocode 600. That is, the keys belonging to share a common prefix that must be different from the one in the sibling by definition. This implies that a lower bound for the length of the prefix is given by $\delta_{min} = \delta(i, i-d)$, so that $\delta(i, j) > \delta_{min}$ for any $k_j$ belonging to $I_i$. This condition is satisfied by comparing $\delta(i, i-1)$ with $\delta(i, i+1)$, and choosing $\delta$ so that $\delta(i, i+d)$ corresponds to the larger one, as is shown in line 3 of pseudocode 600.

At 520, the method includes determining a length of the corresponding range. More particularly, a maximum value or upper bound is determined for the length in embodiments. In addition, the actual value for the length is determined by performing a binary search, in embodiments. Specifically, the other end of the range is determined by searching for the largest/that satisfies $\delta(i, i+ld) > \delta_{min}$, as provided in pseudocode 600. In one embodiment, a power-of-two upper bound $I_{max} > 1$ for the length is determined by starting from value "2" and increasing the value exponentially until it no longer satisfies the inequality, as is shown in lines 6-8 of pseudocode 600. Once the upper bound is determined, the length "l" is determined using binary search in the range [0; $l_{max}-1$]. The idea is to consider each bit of/in turn, starting from the highest one, and set it to one unless the new value would fail to satisfy the inequality, as is shown in lines 10-13 of pseudocode 600. The other end of the range is then given by j=i+ld.

At 530, the method includes determining a highest differing bit between primitive indices in the corresponding range, for purposes of determining the child indices for the given index corresponding to the internal node. For example, in pseudocode 600, δ(i,j) denotes the length of the prefix corresponding to $I_l$, which is labeled by $\delta_{node}$. This is used to find the split position γ by performing a similar binary search for largest s∈[0; l−1] satisfying δ(i, i+sd)>$\delta_{node}$, as is shown in lines 17-20 of pseudocode 600. If d=+1, γ is then given by i+sd, as this is the highest index belonging to the left child. If d=−1, the value is decremented by value one to account for the inverted indexing.

For example, the split position is 1 for internal node "3" 440 in FIG. 4. As shown, the highest differing bit between primitive indices "0-3" of range 445 is between primitive indices "1" 460 and "2" 470. That is, primitive index "1" 460 has a Morton code sequence of "0-0-0-1-0" and primitive index "2" 470 has a Morton code sequence of "0-0-1-0-0". The highest differing bit occurs at the third bit shown by line 490.

Also, at 540, the method includes assigning child node indices for the given node index corresponding of the primitive indices associated with the highest differing bit determined above. For example, in pseudocode 600 of FIG. 6, given i, j, and γ, the children of cover the ranges [min(i, j); γ] and [γ+1; max(i; j)]. For each child, the beginning and end of its range is compared to see whether it is a leaf, and then reference the corresponding node at index γ or γ+1 in accordance with the node layout (e.g., FIG. 4), as shown in lines 23-24 of pseudocode 600 of FIG. 6.

In one embodiment, the algorithm presented in pseudocode 600 of FIG. 6 is implemented on a GPU as a single kernel launch, where each thread is responsible for one internal node. Assuming that the length of the keys is fixed, δ(i, j) can be evaluated efficiently by computing logical XOR between the two keys and counting the leading zero bits in the resulting integer.

The binary radix tree constructed in FIGS. 1-6 is used to construct secondary trees, in embodiments of the invention. In one embodiment, a BVH is constructed from the binary radix tree, in accordance with one embodiment of the present disclosure. Specifically, a BVH for a set of 3D primitives is constructed as follows: (1) assign a Morton code for each primitive according to its centroid, (2) sort the Morton codes, (3) construct a binary radix tree, and (4) assign a bounding box for each internal node.

If the Morton codes of all primitives are unique, it is noted that the binary radix tree is identical in structure to the corresponding linear BVH—identifying the common prefixes between the Morton codes is equivalent to bucketing the primitives recursively according to each bit. The case of duplicate Morton codes is handled explicitly, since the construction algorithm of FIG. 6 relies on the keys being unique. This is accomplished in one embodiment by augmenting each key with a bit representation of its index, i.e. k0 i=ki_i, where _ indicates string concatenation. In practice, there is no need to actually store the augmented keys, because it is enough to simply use i and j as a fallback if ki=k j when evaluating δ(i; j).

Previous methods for linear BVHs calculate the bounding boxes sequentially in a bottom-up fashion, relying on the fact that the set of nodes located on each level is known a priori. In one embodiment, a different approach is presented where the paths from leaf nodes to the root are processed in parallel. Each thread starts from one leaf node and walks up the tree using parent pointers that we record during radix tree construction. Threads are tracked to determine how many threads have visited each internal node using atomic counters, such that the first thread terminates immediately while the second one gets to process the node. This way, each node is processed by exactly one thread, which leads to $\mathcal{O}(n)$ time complexity.

The number of global atomics can be reduced by using faster shared memory atomics whenever it is detected that all the leaves covered by a given internal node are being processed by the same thread block.

Constructing K-D Trees, Octrees, and Quadtrees

In embodiments of the present invention, secondary trees are constructed from the binary radix tree constructed using the methods and systems described in FIGS. 1-6. In particular, the binary radix tree constructed in FIGS. 1-6 is used to construct secondary trees, such as, k-d trees, octrees, and quadtrees, as will be further described below.

Figure 7:
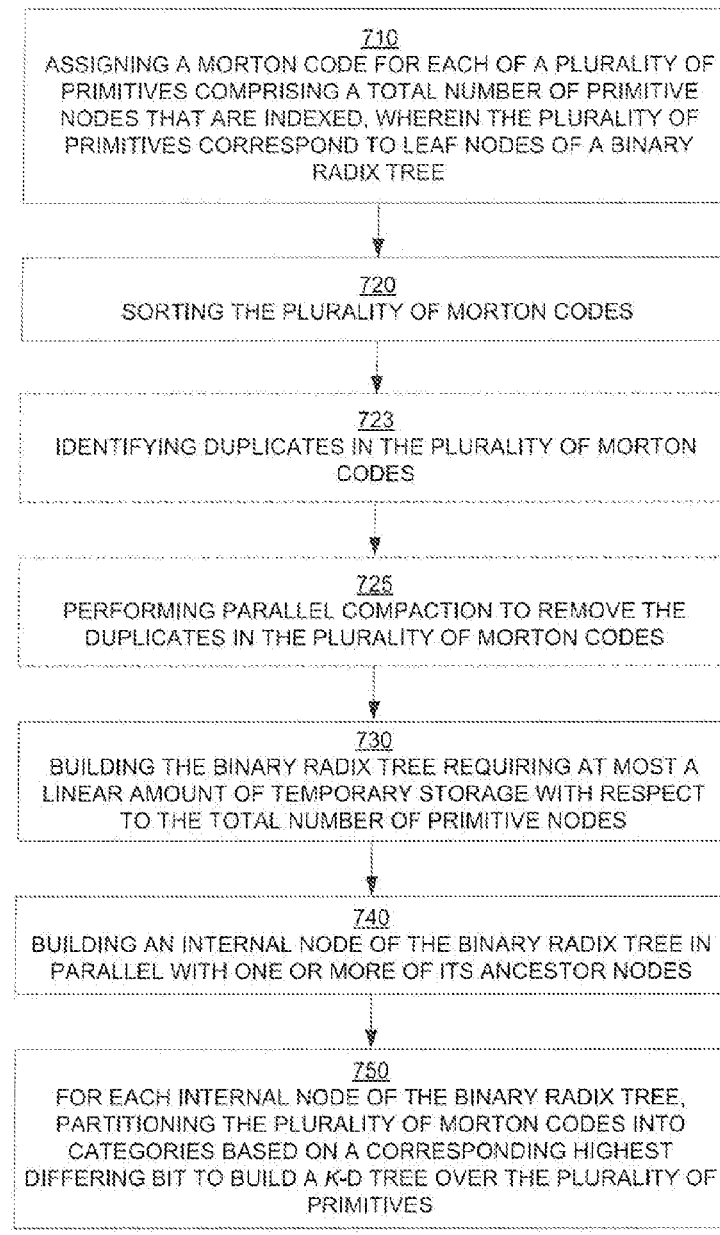
FIG. 7 is a flow diagram illustrating a computer implemented method for constructing k-d trees, in accordance with one embodiment of the invention.

FIG. 7 is a flow diagram 700 illustrating a computer implemented method for constructing k-d trees from binary radix trees as previously described, in accordance with one embodiment of the invention. In another embodiment, flow diagram 700 is implemented within a computer system including a processor and memory coupled to the processor and having stored therein instructions that, if executed by the computer system cause the system to execute a method for constructing k-d trees from binary radix trees as previously described. In still another embodiment, instructions for performing a method constructing k-d trees from binary radix trees as previously described are stored on a non-transitory computer-readable storage medium having computer-executable instructions for causing a computer system to perform a method for constructing k-d trees. The method outlined in flow diagram 700 is implementable by one or more components of the system 100 of FIG. 1.

At 710, the method includes assigning a Morton code to each of a plurality of primitives, wherein the plurality of primitives correspond to leaf nodes of a binary radix tree. In one implementation, the assigning of Morton codes is analogous to the operations performed in 210 of FIG. 2.

In one embodiment, the plurality of primitives comprises a plurality of points. Depending on the intended use of the k-d tree, the primitives can correspond directly to point cloud data given as input, in one implementation. Alternatively, in another implementation, the points can be associated with a 2D or 3D shape, such as, a triangle. To transform the shape to a point, it can, for example, be enclosed within a bounding volume (e.g., bounding box, or AABB). The Morton code is assigned by finding the centroid point of the bounding volume and looking at its bit representation, relative to the scene bounding volume. The plurality of primitives correspond to leaf nodes of the hierarchical binary radix tree that is being generated. In this manner, the bits of each coordinate is expanded, and interleaved to form a single bit string.

At 720, the method includes sorting the plurality of primitives according to their Morton codes. In that manner, the primitives are ordered (e.g., along a space-filling curve) such that primitives close to each other in the three-dimensional space are likely to end up nearby in the sorted sequence. In one implementation, the assigning of Morton codes is analogous to the operations performed in 220 of FIG. 2.

At 723, the method includes optionally identifying duplicates in the plurality of Morton codes. Duplicate Morton codes define points falling within the same leaf node, when comparing adjacent Morton codes. As an example, in one embodiment, at 725 the method optionally performs parallel compaction to remove duplicates in the plurality of primitives, or Morton codes.

At 730, the method includes building the binary radix tree requiring at most a linear amount of temporary storage, considered with respect to a total number of leaf nodes. As such, the binary radix tree is build in a manner requiring only a linear amount of memory with respect to the number of input primitives.

Further, at 740 the method includes building internal nodes of the binary radix tree in parallel. More particularly, an internal node of the binary radix tree is built in parallel with one or more of its ancestor nodes. Correspondingly, one or more internal nodes of the binary radix tree are built in parallel with one or more of its respective ancestor nodes. This provides for accelerated generation of the binary radix tree by simultaneously building different layers of the binary radix tree, and without waiting for the completion of a layer of the binary radix tree before beginning and/or completing another layer of the radix tree.

The binary radix tree is used to directly construct a corresponding k-d tree, in accordance with one embodiment of the present disclosure. Specifically, the binary radix tree can be interpreted as a k-d tree over the plurality of primitives, or rather the plurality of points. That is, for each internal node of the binary radix tree, the plurality of Morton codes is partitioned into categories based on a corresponding highest differing bit in order to build the k-d tree over the plurality of primitives.

More particularly, each internal node partitions the points (e.g., primitives) according to the next bit in the Morton codes after their common prefix. This is equivalent to classifying the points on either side of an axis-aligned split plane in 3D. That is, the Morton codes are classified according to a given bit position that corresponds to an axis aligned split plane. In one implementation, a first category of Morton codes is classified on a first side of a corresponding axis-aligned split plane of an associated internal node. Also, a second category of Morton codes is classified on a second side of the axis-aligned split plane. In one embodiment, the split plane in a k-d tree splits the space approximately in half.

Also, a prefix of length $\delta$, for an internal node, corresponds to a plane perpendicular to the dth main axis, where d=$\delta$ mod 3 when operating in 3D. The position of the plane is given by $0.B_d B_{d+3} \ldots B_{\delta-3} 1$, where $B_i$ represents the ith bit of the prefix. As can be appreciated by those skilled in the art, the above reasoning can be extended to other dimensionalities as well, including but not limited to 2D, 4D, and 5D.

As a result, from a bit string of primitives as Morton codes, a k-d tree is generated. This k-d tree generated from FIGS. 1-7 is then used to generate octrees and/or quadtrees, as described below. In one embodiment, the binary radix tree and k-d tree constructed from the systems and method of FIGS. 1-7 are used to construct another secondary tree, the octree or quadtree.

Figure 8:
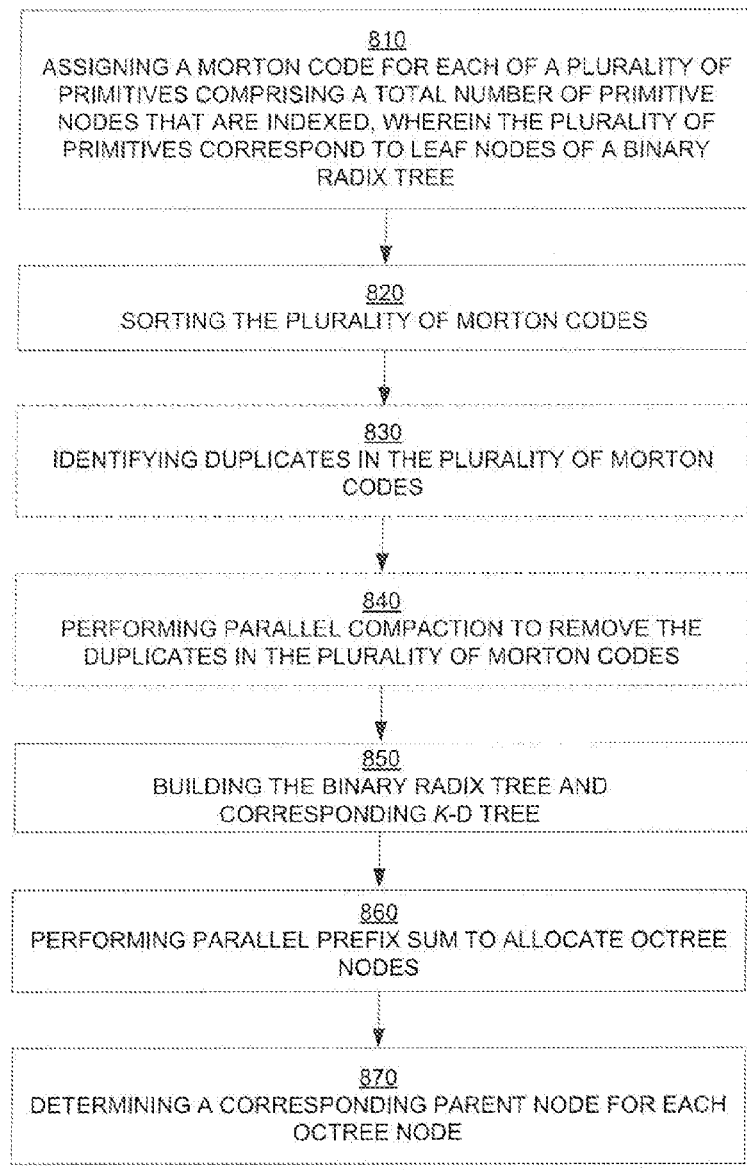
FIG. 8 is a flow diagram 900 illustrating a computer implemented method for constructing octrees and quadtrees, in accordance with one embodiment of the present disclosure.

FIG. 8 is a flow diagram 800 illustrating a computer implemented method for constructing octrees from binary radix trees and/or k-d trees as previously described, in accordance with one embodiment of the invention. In another embodiment, flow diagram 800 is implemented within a computer system including a processor and memory coupled to the processor and having stored therein instructions that, if executed by the computer system cause the system to execute a method for constructing octrees from binary radix trees and/or k-d trees as previously described. In still another embodiment, instructions for performing a method for constructing octrees from binary radix trees and/or k-d trees as previously described are stored on a non-transitory computer-readable storage medium having computer-executable instructions for causing a computer system to perform a method for constructing octrees trees. The method outlined in flow diagram 800 is implementable by one or more components of the system 100 of FIG. 1.

The building of the octree begins similar to the construction of a k-d tree, as previously described in relation to FIG. 7. As such, portions of the operations described in FIG. 7 are relevant in the construction of an octree in embodiments of the present invention. More particularly, at 810 the method includes assigning a Morton code to each of a plurality of primitives, wherein the plurality of primitives correspond to leaf nodes of a binary radix tree. Each of the primitives is defined as a point, and in one embodiment is taken as a centroid of a volume (e.g., axis-aligned bounding box) fully encompassing the 3D shape associated with the primitive. In one implementation, the assigning of Morton codes is analogous to the operations performed in 210 and 710 of FIGS. 2 and 7.

At 820, the method includes sorting the primitives according to the Morton codes. In that manner, nearby primitives located in space are likely to end up near to other in the sorted sequence. In one implementation, the sorting of primitives is analogous to the operations performed in 220 and 720 of FIGS. 2 and 7.

At 830, the method includes optionally identifying duplicates in the plurality of Morton codes. Duplicate Morton codes define points falling within the same leaf node, when comparing adjacent Morton codes. As an example, in one embodiment, at 840 the method optionally performs parallel compaction to remove duplicates in the plurality of primitives, or Morton codes.

At 850, the method includes building the binary radix tree and corresponding k-d tree. In one implementation, this is analogous to the operations performed in 230-240 and 730-750 of FIGS. 2 and 7. More specifically, the binary radix tree and corresponding k-d tree are constructed in a manner that requires at most a linear amount of temporary storage with respect to the total number of leaf nodes. Also, the binary radix tree and corresponding k-d tree are built or constructed in parallel, such that one or more internal nodes of the tree is built in parallel with one or more of their respective ancestor nodes. In one embodiment, the k-d tree is generated from the binary radix tree, and more specifically over the plurality of primitives defining the Morton codes, by partitioning, for each internal node, the plurality of Morton codes into categories based on a corresponding highest differing bit.

Additionally, to construct an octree for a set of points or Morton codes, each 3k-bit prefix of a given Morton code maps directly to an octree node at level k. In one embodiment, these prefixes are enumerated by looking at the edges of a corresponding binary radix tree, such that an edge connecting a parent with a prefix of length $\delta_{parent}$ to a child with a prefix of length $\delta_{child}$ represents all subprefixes of length $\delta_{parent}$+1, ..., $\delta_{child}$. Out of these, $\lfloor \delta_{child}/3 \rfloor - \lfloor \delta_{parent}/3 \rfloor$ are divisible by 3. In other words, a number of octree nodes is determined for each node of the corresponding k-d tree, and is accomplished during construction of the k-d tree. This is accomplished by determining the number of bit triplet boundaries crossed along an edge connecting a node and its parent node in the corresponding k-d tree, which corresponds to the number of octree nodes for that node in the k-d tree.

Also, a total number of octree nodes for the entire k-d tree is determined. For instance, in one embodiment, the method includes performing a parallel prefix sum operation to determine the total number of octree nodes. In addition, a parallel prefix sum is also performed at 860 to allocate indexes for the octree nodes in an output array.

At 870, the method includes determining a corresponding parent node for each octree node. A parent of a corresponding octree node is found by looking at the immediate ancestors of each k-d tree node. For example, by stepping up the k-d tree, the closest node of the k-d tree is determined that is outputting at least one octree node. The bottom-most one of them is then defined as the parent of the corresponding octree node. As such, a parent/child relationship is established. In this manner, the octree nodes are output with parent and child relationships.

In another embodiment, the method described in relation to FIG. 8 is adapted to build quadtrees instead of octrees. Since quadtrees are essentially two-dimensional counterparts of octrees, the required changes to the method are as follows. At 810, the Morton code for a given point is defined by the bit string X0Y0X1Y1 (instead of X0Y0Z0X1Y1Z1), since the z-coordinate is not meaningful in the case of a quadtree. At 850, a prefix of length δ corresponds to a plane perpendicular to the dth main axis, where d=δ mod 2 (instead of d=δ mod 3). The position of the plane is given by $0.B_d B_{d+2} \ldots B_{\delta-2} 1$ (instead of $0.B_d B_{d+3} \ldots B_{\delta-3} 1$). At 860 and 870, the number of quadtree nodes corresponding to a given edge in the k-d tree is determined by counting the number of bit pair boundary crossings between the parent node and the child node (instead of bit triplet boundary crossings).

Thus, according to embodiments of the present disclosure, systems and methods are described that provide maximizing parallelism in the construction of binary radix trees and the subsequent generation of k-d trees, octrees, and quadtrees.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

What is claimed:

1. A non-transitory computer-readable medium having computer-executable instructions for causing a computer system to perform a method comprising:
   assigning a Morton code for each of a plurality of primitives, wherein said plurality of primitives correspond to leaf nodes of a binary radix tree;
   sorting said plurality of Morton codes;
   building said binary radix tree requiring at most a linear amount of temporary storage with respect to a total number of leaf nodes;
   building an internal node of said binary radix tree in parallel with one or more of its ancestor nodes; and
   for each internal node of said binary radix tree, partitioning said plurality of Morton codes into categories based on a corresponding highest differing bit to build a k-d tree over said plurality of primitives, wherein a prefix of an internal node having a length δ corresponds to a plane perpendicular to the dth main axis, wherein d=δ mod D, and D is equal to a number of dimensions, and wherein said partitioning comprises:
      classifying a first category of Morton codes on a first side of a corresponding axis-aligned split plane in three dimensions (3D); and
      classifying a second category of Morton codes on a second side of said corresponding axis-aligned split plane.

2. The non-transitory computer-readable medium of claim 1, wherein said axis-aligned split plane splits a corresponding space in half.

3. The non-transitory computer-readable medium of claim 1, wherein said plurality of primitives comprises a plurality of points.

4. The non-transitory computer-readable medium of claim 3, wherein said assigning a Morton code for each of a plurality of primitives in said method further comprises:
   assigning a first Morton code for a first primitive according to a centroid point of a bounding volume encompassing said primitive.

5. A non-transitory computer-readable medium having computer-executable instructions for causing a computer system to perform a method comprising:
   assigning a Morton code for each of a plurality of primitives, wherein said plurality of primitives correspond to leaf nodes of a binary radix tree;
   sorting said plurality of Morton codes;
   building said binary radix tree requiring at most a linear amount of temporary storage with respect to a total number of leaf nodes;
   building an internal node of said binary radix tree in parallel with one or more of its ancestor nodes;

determining a number of octree nodes for each node of said binary radix tree by determining, for each edge of said binary radix tree, a number of bit triplet boundaries crossed when moving from a parent node to a child node in said binary radix tree to determine a number of octree nodes corresponding to an edge;

determining a total number of octree nodes;

allocating said total number of octree nodes; and outputting each of said total number of octree nodes.

6. The non-transitory computer-readable medium of claim 5, wherein said allocating said total number of octree nodes in said method comprises:

performing a parallel prefix sum.

7. The non-transitory computer-readable medium of claim 5, wherein said outputting each of said total number of octree nodes in said method comprises:

determining a parent of an octree node based on its immediate ancestors in said binary radix tree.

8. The non-transitory computer-readable medium of claim 5, wherein said plurality of primitives comprises a plurality of points.

9. The non-transitory computer-readable medium of claim 8, wherein said assigning a Morton code for each of a plurality of primitives in said method further comprises:

assigning a first Morton code for a first primitive according to a centroid point of a bounding volume encompassing said primitive.

10. The non-transitory computer-readable medium of claim 5, wherein said sorting said plurality of Morton codes in said method further comprises:

identifying duplicate Morton codes; and removing said duplicate Morton codes.

11. A computer system comprising:

a processor; and memory coupled to said processor and having stored therein instructions that, if executed by said compute system, cause said computer system to execute a method comprising:

assigning a Morton code for each of a plurality of primitives, wherein said plurality of primitives correspond to leaf nodes of a binary radix tree;

sorting said plurality of Morton codes;

building said binary radix tree requiring at most a linear amount of temporary storage with respect to a total number of leaf nodes;

building an internal node of said binary radix tree in parallel with one or more of its ancestor nodes;

determining a number of octree nodes for each node of said binary radix tree by determining, for each edge of said binary radix tree, a number of bit triplet boundaries crossed when moving from a parent node to a child node in said binary radix tree to determine a number of octree nodes corresponding to an edge;

determining a total number of octree nodes;

allocating said total number of octree nodes; and outputting each of said total number of octree nodes.

12. The computer system of claim 11, wherein said allocating said total number of octree nodes in said method comprises:

performing a parallel prefix sum.

13. The computer system of claim 11, wherein said outputting each of said total number of octree nodes in said method comprises:

determining a parent of an octree node based on its immediate ancestor in said binary radix tree.

14. The computer system of claim 11, wherein said plurality of primitives comprises a plurality of points.

15. The computer system of claim 14, wherein said assigning a Morton code for each of a plurality of primitives in said method further comprises:

assigning a first Morton code for a first primitive according to a centroid point of a bounding volume encompassing said primitive.

16. The computer system of claim 11, wherein said sorting said plurality of Morton codes in said method further comprises:

identifying duplicate Morton codes; and removing said duplicate Morton codes.

\* \* \* \* \*